(12) United States Patent
Stafford

(10) Patent No.: US 6,990,996 B2
(45) Date of Patent: Jan. 31, 2006

(54) TORQUE CONVERTER CLUTCH REGULATOR VALVE ASSEMBLY AND METHOD OF INSTALLATION

(75) Inventor: Maura Jane Stafford, Warner Robins, GA (US)

(73) Assignee: Sonnax Industries, Inc., Bellows Falls, VT (US)

( * ) Notice: Subject to any disclaimer, the term of this patent is extended or adjusted under 35 U.S.C. 154(b) by 266 days.

(21) Appl. No.: 10/424,894

(22) Filed: Apr. 28, 2003

(65) Prior Publication Data

US 2005/0005971 A1    Jan. 13, 2005

Related U.S. Application Data

(60) Provisional application No. 60/376,073, filed on Apr. 29, 2002.

(51) Int. Cl.
*F16K 27/04* (2006.01)

(52) U.S. Cl. .................... 137/454.2; 192/3.3
(58) Field of Classification Search ............ 137/15.19, 137/15.17, 315.11, 315.27, 454.2; 192/3.28, 192/3.29, 3.3
See application file for complete search history.

(56) References Cited

U.S. PATENT DOCUMENTS

| | | | | |
|---|---|---|---|---|
| 4,271,939 A | | 6/1981 | Iwanaga et al. ............. 192/3.3 |
| 4,618,036 A | * | 10/1986 | Ideta ......................... 192/3.3 |
| 4,880,090 A | * | 11/1989 | Ando ......................... 192/3.3 |
| 4,989,702 A | * | 2/1991 | Yoshimura et al. ......... 192/3.29 |
| 5,339,935 A | * | 8/1994 | Ishii et al. ................... 192/3.3 |
| 5,967,928 A | * | 10/1999 | Younger ...................... 475/120 |
| 6,117,047 A | * | 9/2000 | Younger ...................... 472/120 |
| 6,619,323 B1 | * | 9/2003 | Stafford .................. 137/625.69 |
| 6,736,747 B1 | * | 5/2004 | Stafford ...................... 475/116 |
| 6,776,736 B1 | * | 8/2004 | Stafford et al. ............. 475/127 |
| 6,826,908 B1 | * | 12/2004 | Stafford ...................... 475/127 |
| 6,832,632 B1 | * | 12/2004 | Wallace ................. 137/625.66 |
| 6,832,671 B1 | * | 12/2004 | Stafford ...................... 192/3.3 |

OTHER PUBLICATIONS

U.S. Appl. No. 09/939,372, filed Aug. 27, 2001, Stafford.

* cited by examiner

*Primary Examiner*—John Rivell
(74) *Attorney, Agent, or Firm*—Clifford F. Rey

(57) ABSTRACT

A replacement torque converter clutch regulator valve assembly for use within an automatic transmission including two cooperating valves, namely a regulator apply valve and an isolator valve, disposed in fluid communication with a line pressure circuit and a torque converter clutch apply circuit is disclosed. In one embodiment the regulator apply valve employs a regulator apply valve sleeve, which provides support to the regulator apply valve to prevent side loading. Modified control lands on the regulator apply valve have a reduced cross-sectional area calculated to increase the influence of the pulse width modulated solenoid, which provides an output pressure in response to the duty cycle imposed on the solenoid coil in pulse width modulated converter systems. In an alternative embodiment an isolator valve sleeve is utilized for instances wherein the isolator valve bore has extreme wear that cannot be corrected solely by the installation of the replacement isolator valve.

18 Claims, 6 Drawing Sheets

TORQUE CONVERTER CLUTCH REGULATOR VALVE ASSEMBLY AND METHOD OF INSTALLATION

CROSS-REFERENCE TO RELATED APPLICATION

This application claims the benefit under 35 U.S.C.§ 119(e) of U.S. Provisional Patent Application No. 60/376, 073 filed Apr. 29, 2002, entitled Torque Converter Clutch Regulator Valve and Method of Installation.

BACKGROUND OF INVENTION

The present invention relates to the field of hydraulic circuits within automatic transmission systems and, more particularly, to a replacement torque converter clutch (hereinafter "TCC") regulator valve that reduces fluid pressure loss to the torque converter apply and release circuits, which actuate the torque converter clutch.

The General Motors 4L60-E (hereinafter "GM") transmission and other similar GM transmissions are equipped with mechanisms to "lockup" their torque converters to varying degrees under certain operating conditions. The purpose of the lockup converter is to provide for direct drive when the vehicle is cruising at higher speeds. Since there is always some slippage in the fluid coupling of a torque converter, some power is lost and fuel economy suffers. By providing a direct mechanical coupling through the transmission at high engine speeds, the lockup converter improves fuel economy.

This is accomplished by an electronic/hydraulic torque converter clutch system, which utilizes a lockup piston within the torque converter housing. The lockup piston has friction material on its forward surface. When the vehicle is at cruising speed and lockup is desired, an electric solenoid is energized which opens the torque converter clutch (hereinafter "TCC") regulator valve. This allows fluid pressure to act upon the lockup piston, which is forced against a machined surface on the converter cover. Thus, the lockup piston and the converter cover are locked together and act as a single unit similar to a manual transmission clutch. When lockup is no longer required, a port opens that allows the pressurized fluid to exhaust. The lockup piston then moves away from the torque converter housing re-establishing the fluid coupling.

Early 4L60E transmissions utilized $2^{nd}$ gear clutch fluid, which was essentially line pressure applied via an orifice, to actuate the TCC regulator valve. In this version of the transmission, the TCC regulator valve and the isolator valve were combined into one valve. In later versions lockup in the electronic torque converter clutch system was controlled by a pulse width modulated torque converter clutch (hereinafter "PWM TCC") solenoid that provides an output or control pressure in response to the duty cycle imposed on the solenoid coil.

In 1993 General Motors converted to the PWM actuated TCC regulator valve and divided it into two separate valves, namely the regulator apply valve and the isolator valve. Thus, in the PWM versions (1993–1997) of the 4L60E torque converter, there are actually two converter solenoids being employed in the system. The PWM TCC solenoid sends automatic transmission fluid (hereinafter "ATF") to the isolator valve. Since the PWM TCC solenoid is duty-cycling the isolator valve, it oscillates continuously within the valve body. The regulator apply valve receives line pressure and regulates it to a lesser pressure, which is known as converter apply pressure. Converter apply pressure is not actually sent to the torque converter, but to the TCC apply valve. The TCC apply valve is actuated by the TCC solenoid. This solenoid is simply an On/Off type solenoid and not a PWM type. It is the TCC apply valve that actually directs ATF to the torque converter.

In 1998 General Motors went to the "EC3" style torque converter. This design allows the torque converter to continuously slip from $2^{nd}$ gear upward without ever locking up completely. This design was intended to improve fuel economy and converter control. The regulator apply and isolator valves were changed only slightly and function exactly the same as the 1993–1997 PWM version.

A disadvantage associated with these systems is the pulsating flow generated by the pulse width modulated TCC isolator valve as it cycles between its open and closed positions. The isolator valve imparts some of this pulsating movement to the regulator apply valve. These pulsations cause wear within the valve body resulting in hydraulic fluid leakage and incorrect pressure responses. As a result vehicles with a 4L60E transmission often have insufficient TCC apply pressure causing uncontrolled clutch slippage, which overheats the converter and generates TCC slip codes requiring service work. These complaints can often be caused by ATF leakage past the TCC regulator valve resulting in reduced converter apply pressure.

There are known prior art patents that are available in the field and their discussion follows. One example is U.S. Pat. No. 4,271,939 to Iwanga et al. (hereinafter "939 patent"), which discloses a hydraulic control system for a torque converter for ensuring release of the lock-up condition of the torque converter. This is accomplished by providing a flow restrictor in the hydraulic working fluid supply passage for the torque converter to make the flow resistance of the passage equal to or larger than the flow resistance of the hydraulic working fluid supply passage for the lock-up control chamber. In this control system a first or feed passageway communicates with a source of pressurized fluid and with a torque converter chamber, a second or discharge passageway communicates with the torque converter chamber and a third passageway communicates with a lock-up control or clutch chamber of the lockup clutch. A lockup control valve communicates with the same source of pressurized fluid and with the third passageway. The first passageway is provided with the flow restrictor. With the provision of the flow restrictor, the disengagement of the lockup clutch will be assured upon pressurization of the third passageway.

Another example is U.S. Pat. No. 4,618,036 to Ideta (hereinafter "036 patent"), which discloses a hydraulic control system for the lockup clutch of a torque converter wherein release of a lockup clutch is ensured even when the discharge flow rate of the pump is low. This control system comprises a pump driven by an engine to discharge fluid, a torque converter having a lockup clutch with a lockup clutch piston movable to a clutch released position when fluid pressure within a lockup release chamber is higher than fluid pressure within a working chamber in the torque converter cavity, a line pressure regulator valve and an orifice, which provides a restricted flow communication between the torque converter and the pump even when line pressure generated by the line pressure regulator valve is lower than a predetermined value. The Ideta ('036) patent utilizes cutouts 20 formed on the land 32d of the first spool 32 (FIG. 1) on the line pressure regulator valve to permit a sufficient flow of hydraulic fluid via oil conduit 62 to torque converter 10 at low speed operation to ensure the release of the lockup clutch.

While these patents relate generally to hydraulic control systems for torque converters, they do not disclose improving hydraulic control over the torque converter clutch apply circuit or a related method for restoring the hydraulic integrity of such circuits by use of a replacement valve mechanism.

Pending U.S. patent application Ser. No. 09/939,372 to Stafford discloses an actuator feed limit valve (hereinafter "AFL") assembly comprising a replacement hydraulic valve mechanism for installation within the original equipment valve body of an automatic transmission. The AFL valve directs line pressure into the actuator feed limit circuit, which feeds the shift solenoids, pressure control solenoid and other hydraulically actuated components of the transmission. This valve mechanism utilizes a full contact valve sleeve having inlet and exhaust ports disposed about its circumference, which substantially reduces side loading, bore wear, and AFL fluid circuit leakage. However, this patent application does not disclose the structural improvements and technical advantages of the present invention.

SUMMARY OF THE INVENTION

Accordingly, the present invention is a replacement TCC regulator valve assembly for the GM 4L60-E transmissions comprised of two separate valves, namely a regulator apply valve and an isolator valve, which is designed to increase fluid pressure within the torque converter apply circuit and to restore the hydraulic integrity thereof.

In one embodiment the replacement TCC regulator valve assembly employs a wear-resistant regulator apply valve sleeve, which has been added to provide full support to the regulator apply valve to prevent side loading (i.e. lateral movement) in operation. The control lands or so-called spools on the regulator apply valve have been reduced in diameter area by up to 10% in comparison to the original equipment valve, which reduces the balance circuit apply surface on the end face of the apply valve. Thus, the overall effect is to increase the influence of the PWM TCC solenoid on valve operation resulting in increased line pressure flow to the converter apply circuit for transmissions having such PWM converter systems.

In addition, the axial length of the replacement isolator valve has been increased in comparison to the original equipment valve to reside in contact with the unworn portions of the mating bore in the valve body to ensure accurate operation. Annular lubrication grooves have also been added to the present isolator valve for better valve centering to improve performance.

In an alternative embodiment, an optional isolator valve sleeve is added to the present TCC regulator valve assembly for instances wherein the OEM isolator valve bore has extreme wear that cannot be corrected solely by the installation of a replacement isolator valve.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1A:
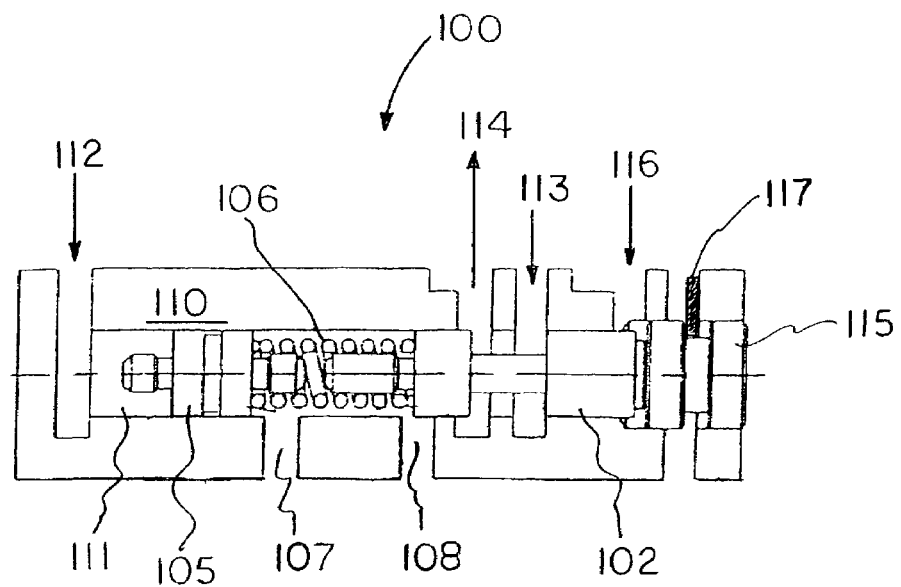
FIG. 1A is a longitudinal cross-section of a TCC regulator valve assembly disposed within the valve body of a GM transmission and labeled Prior Art.

Prior to describing the present invention in detail it may be beneficial to review the structure and function of a TCC regulator valve of the prior art. With reference to the drawings there is shown therein such a TCC regulator valve of the prior art, indicated generally at 100 and illustrated in FIG. 1A. The prior art TCC regulator valve 100 made available in some GM vehicles from 1993 to 1997 is comprised of a regulator apply valve 102, an isolator valve 105, and an isolator valve spring 106 arranged within the valve body 110.

Figure 1B:
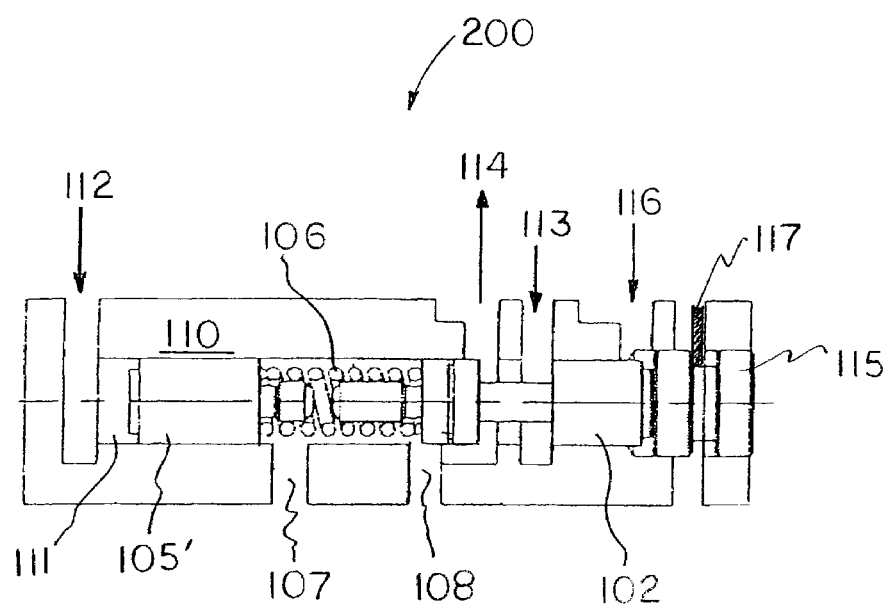
FIG. 1B is a longitudinal cross-section of another embodiment of a prior art TCC regulator valve assembly disposed within the valve body of a GM transmission labeled Prior Art.

FIG. 1B illustrates another prior art TCC regulator valve, indicated generally at 200, which was made available on GM vehicles in 1998. The TCC regulator valve 200 is similarly constructed for installation in the valve body 110 with the exception of the isolator valve 105' wherein the configuration has been modified.

Still referring to FIG. 1B these components are arranged in coaxial relation as shown within a mating bore 111 and are captured in the valve body 110 by an end plug 115, which is secured by a retaining clip 117. The valve body 110 includes ATF exhaust ports 107, 108, a PWM TCC solenoid circuit as at 112 for receiving pressurized ATF, a line pressure port 113 for counteracting fluid pressure delivered via the PWM TCC solenoid port 112, a TCC apply circuit as at 114 for sending pressurized ATF to the TCC apply valve (not shown), and a TCC apply balance port 116.

In the early prior art designs the isolator valves 105, 105' (FIGS. 1A and 1B) are fabricated from steel. Valves 105, 105' continuously oscillate within the bore 111 of the aluminum valve body 110 as the PWM TCC solenoid cycles to provide smooth converter clutch engagement. Such oscillating movement wears the bore 111 at locations adjacent the isolator valves 105, 105' allowing PWM TCC solenoid pressure to leak past the isolator valves 105, 105' to exhaust. The regulator apply valve 102 also wears the bore 111 allowing converter apply pressure leakage, which eventually causes unwanted clutch slippage and overheating of the torque converter.

Figure 2A:
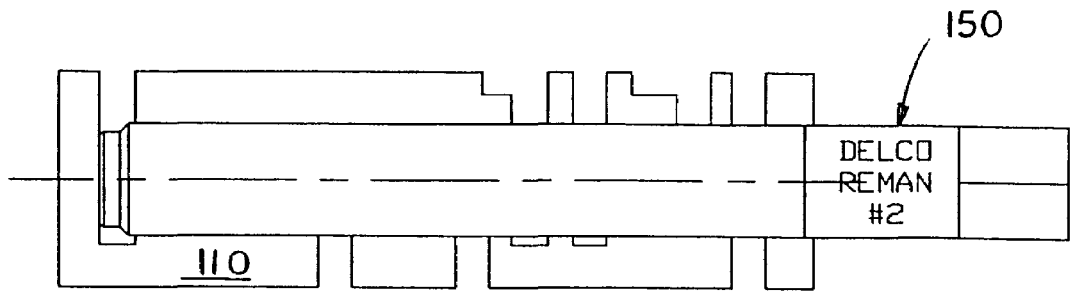
FIG. 2A is a longitudinal cross-section of a reaming tool within the valve body for resizing the bore prior to installation of a remanufactured TCC regulator valve assembly labeled Prior Art and shown in FIG. 2B.
Figure 2B:
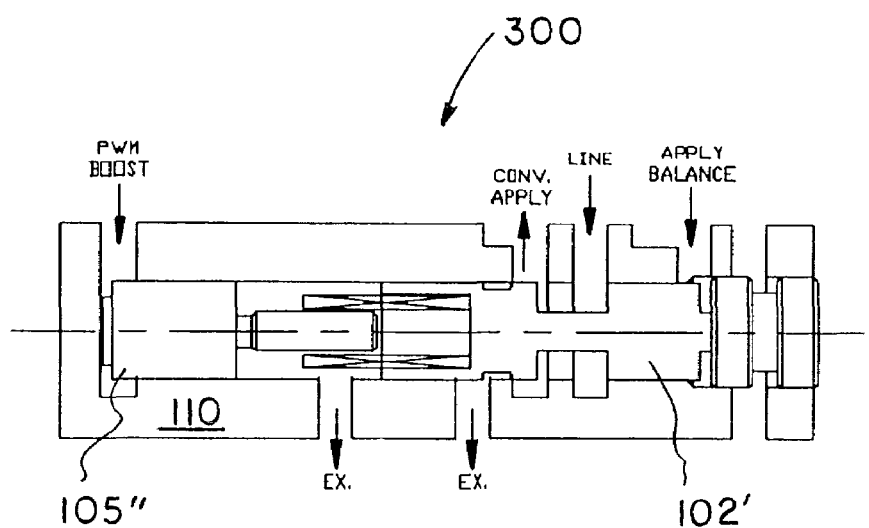
FIG. 2B is a longitudinal cross-section of a remanufactured TCC regulator valve labeled Prior Art.

It is known in the prior art to ream the bore 111 oversize by the use of a suitable reaming tool 150 as shown in FIG. 2A to resurface the bore and to replace the original equipment manufacture (hereinafter "OEM") valves 102, 105 with oversize valves 102', 105' as seen in FIG. 2B. However, using this repair technique and the resulting remanufactured TCC regulator valve assembly 300 (FIG. 2B) has proven to be unsatisfactory and has resulted in very early wear problems in such remanufactured units. Thus, the present invention has been developed to resolve these problems and will now be described.

Figure 3A:
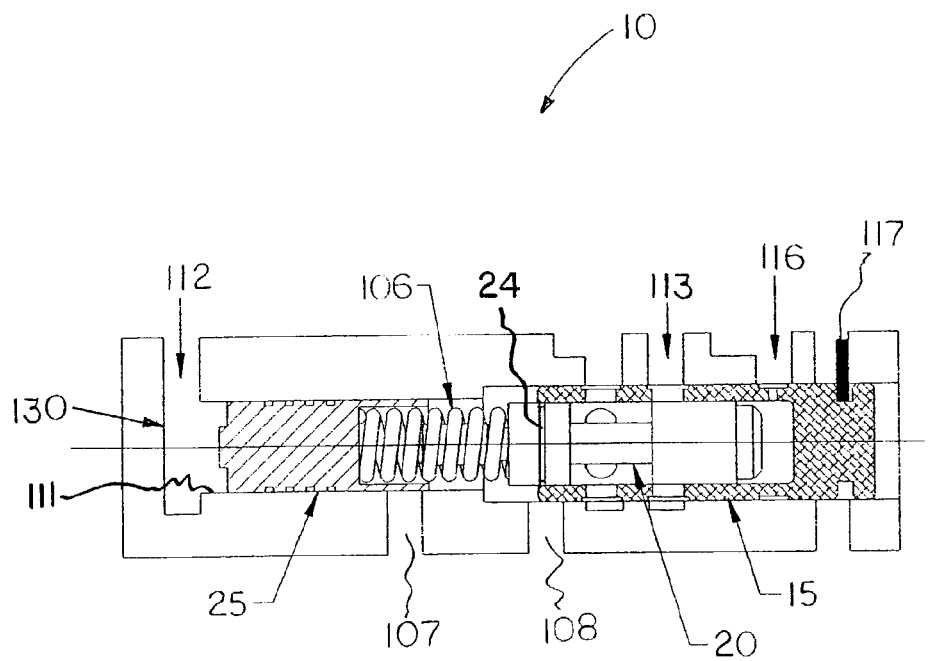
FIG. 3A is a longitudinal cross-section of the replacement TCC regulator valve assembly of the present invention shown in the closed position.
Figure 3B:
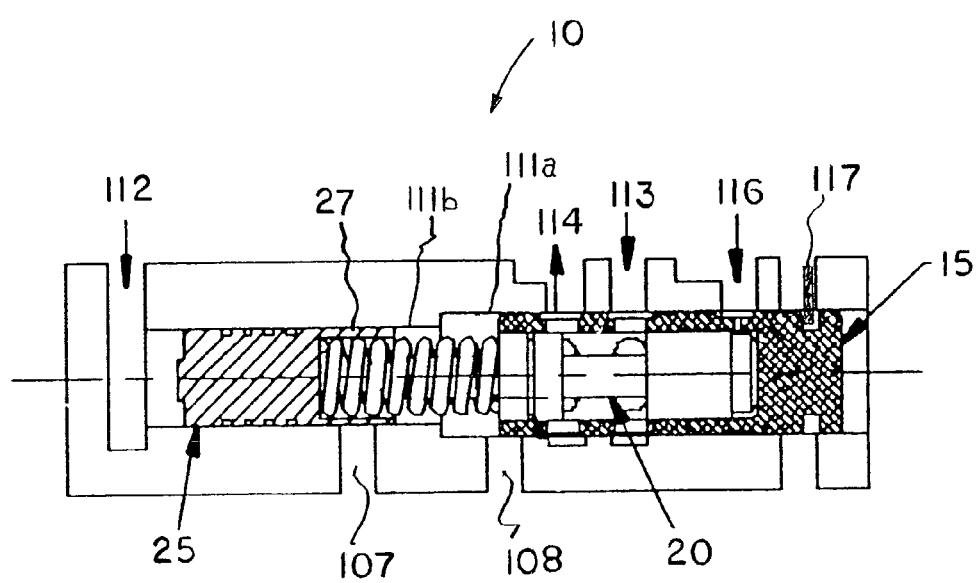
FIG. 3B is a longitudinal cross-section of the replacement TCC regulator valve of FIG. 3A shown in the open position.

Referring to FIGS. 3A and 3B there is shown a replacement TCC regulator valve assembly in accordance with the present invention, indicated generally at 10. The present TCC regulator valve assembly 10 includes a replacement regulator apply valve, indicated generally at 20, a new regulator apply valve sleeve, indicated generally at 15, and a replacement isolator valve, indicated generally at 25. The OEM isolator valve spring 106 and the OEM retaining clip 117 may be reused in the present invention. The OEM end plug 115 is effectively integrated into the present sleeve 15 and, thus, the OEM plug 115 may be discarded.

Figure 4:
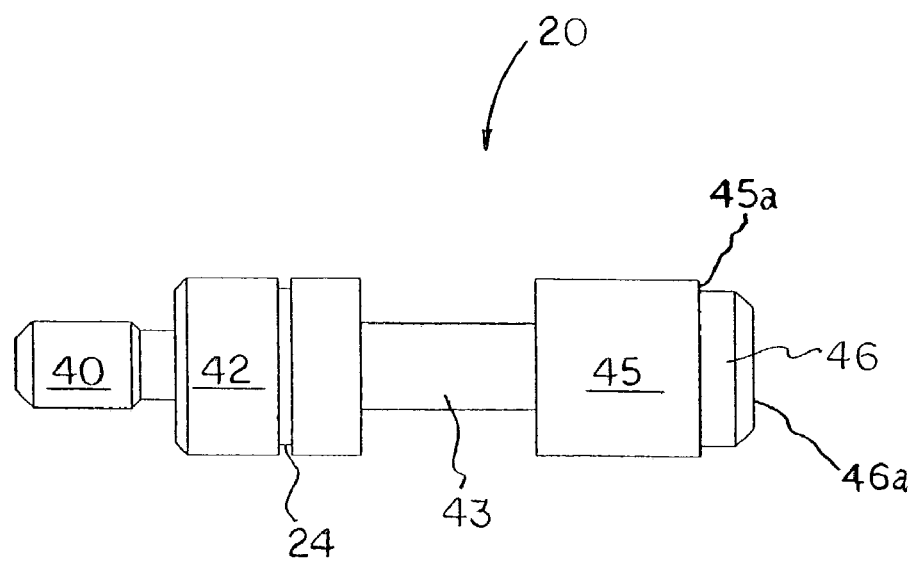
FIG. 4 is a side elevational view of the modified regulator apply valve of the present invention.

Referring to FIG. 4 the present regulator apply valve 20 is illustrated. This spool-type valve 20 includes a pair of control diameters or lands 42, 45 interconnected by a stem portion 43, which may include a peripheral groove formed thereon (not shown) for identification purposes. A spring locating diameter 40 is formed coaxially with land 42 and functions to guide the spring 106 against the end face of land 42.

Land 42 also includes an annular, lubrication groove 24 that fills with ATF during operation. This provides an even film of lubrication about land 42, which resists side loading and uneven wear within the mating bore 111. The end face 45a of land 45 in combination with the end face 46a of the chamfered contact diameter 46 defines a reaction surface (i e. balance apply surface) for pressurized ATF entering the balance apply port at 116 (FIGS. 3A and 3B).

Lands 42, 45 function to control the flow of line pressure as at 113 to the TCC apply circuit 114 as hereinafter described. In the present invention the outside diameters of lands 42, 45 have been reduced by up to 10% in comparison to the OEM apply valve 102 to reduce the balance apply surface 45a, 46a (as defined hereinabove) rendering the present regulator apply valve 20 less responsive to balance apply pressure via circuit 116 and, accordingly, more responsive to pulse width modulated (PWM) solenoid control via circuit 112. This results in an increased flow of ATF from line pressure circuit 113 to converter apply circuit 114 and higher converter apply pressure in operation.

In the preferred embodiment the regulator apply valve 20 is fabricated from aluminum material per 6262-T8/T9 or 6061-T6 and is hard anodized per MIL-A-8625, Type III, Class 2 to provide an optimal coefficient of friction with the mating valve sleeve 15.

Figure 5:
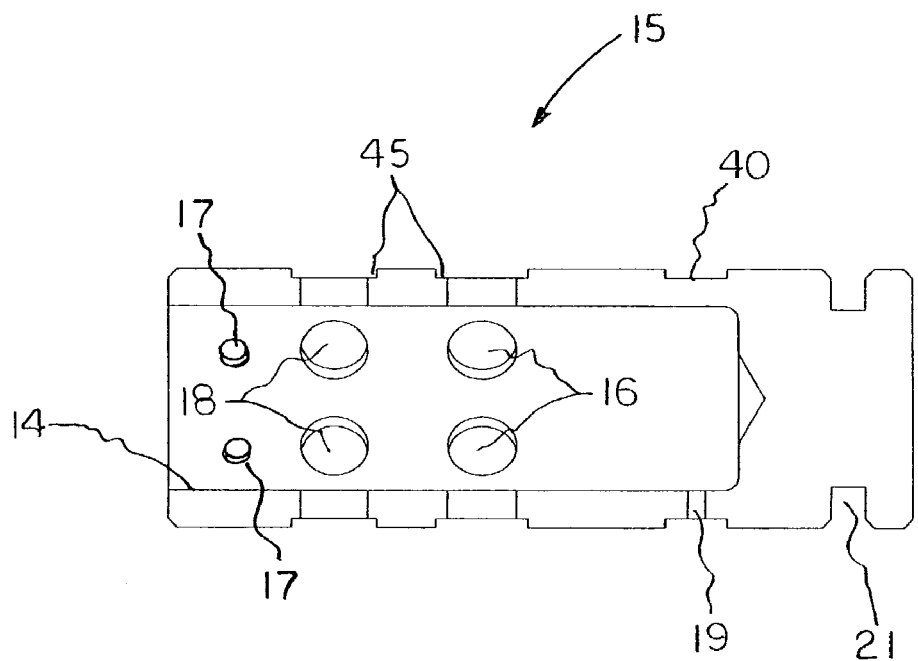
FIG. 5 is a longitudinal cross-section of the regulator apply valve sleeve of the present invention.

As more clearly shown in FIG. 5, sleeve 15 is a generally cylindrical construction having a longitudinal bore 14 of sufficient size to allow valve 20 to oscillate therein. Sleeve 15 includes a plurality of inlet ports 16 and a plurality of outlet ports 18 formed within annular grooves 45 at predetermined locations in fluid communication with the line pressure port 113 and the TCC apply circuit 114 respectively (FIG. 3B). Sleeve 15 includes at least one TCC balance apply orifice 19 formed within the annular groove 40 (FIG. 5) at a predetermined location in fluid communication with the TCC balance apply circuit 116. The sleeve 15 may also include a plurality of exhaust ports 17 formed at a distal end thereof in proximity to exhaust port 108.

An annular groove 21 is formed at one end of the sleeve 15 for receiving the OEM retaining clip 117. Once the valve sleeve 15 is placed within the valve body 110, the retaining clip 117 is installed within the annular groove 21 to secure the sleeve 15 and the entire TCC regulator valve assembly 10 within the valve body 110. Thus, it will be appreciated that the primary feature (i.e. groove 21) and the function (i.e. valve containment) of the prior art end plug 115 (FIG. 1A) are effectively integrated into the present regulator apply valve sleeve 15.

In one embodiment the sleeve 15 is fabricated from a high grade 4032-T6/T651/T86 aluminum to provide an optimal working surface for contact with the hard anodized regulator apply valve 20 and increased service longevity in comparison to the OEM design. The present sleeve 15 functions to restore the hydraulic integrity of the TCC apply circuit 114 and to provide full support to the regulator apply valve 20 within the sleeve 15 thereby eliminating the side-loading problem inherent in the OEM design.

Figure 6:
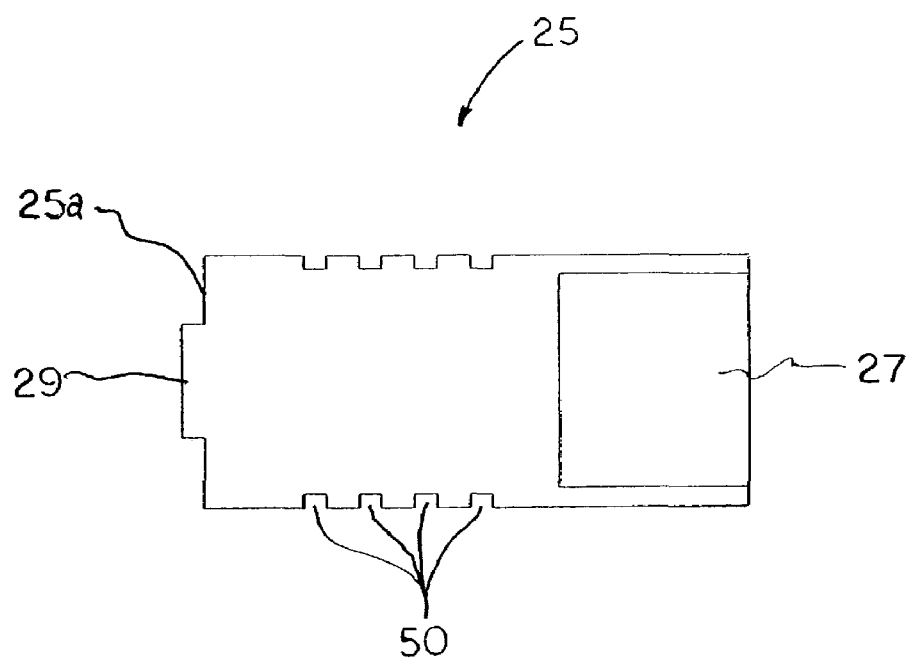
FIG. 6 is a longitudinal cross-section of the modified isolator valve of the present invention.

Referring to FIG. 6 there is shown a replacement isolator valve in accordance with the present invention, indicated generally at 25. Isolator valve 25 is a generally cylindrical construction fabricated from low carbon steel and case hardened to a predetermined case depth to resist wear. Isolator valve 25 includes a plurality of annular grooves 50 formed thereon, which function to center the valve 25 within the bore 111 by filling with ATF during operation and to distribute hydraulic pressure across the surface of the valve to prevent side-loading. In the embodiment shown four annular grooves 50 are formed in parallel relation at regular intervals on the outside diameter of the valve 25.

The replacement isolator valve 25 has an increased axial length that is approximately 0.560 inches longer than the OEM isolator valves 105, 105', 105" (FIGS. 1A, 1B, and 2B), and yet retains adequate clearance and proper function within its mating bore 111 in the OEM valve body 110. The increased axial length allows the isolator valve 25 to ride in the unworn portions of the valve body 111 in the area adjacent exhaust port 107 (FIG. 3B) ensuring concentric operation of the isolator valve 25 in combination with the regulator apply valve 20.

The isolator valve 25 includes a spring recess 27 integrally formed therein at a proximal end thereof to receive spring 106. The isolator valve 25 may also include an axial protuberance 29 formed on a distal end thereof. The protuberance 29 permits ATF entering the PWM TCC solenoid port 112 to flow evenly around protuberance 29 to the actuating surface 25*a* of the valve 25. The protuberance 29 also prevents the end face of the valve 25 from striking against the inside of the valve body 110 as at 130 (FIG. 3A), which would disrupt ATF flow resulting in pressure loss within the converter apply circuit 114.

Figure 7:
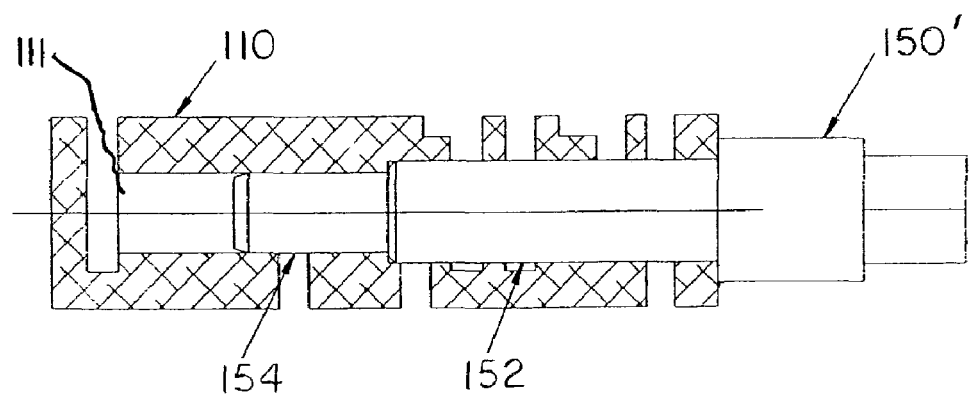
FIG. 7 is a longitudinal cross-section of a reaming tool of the present invention within the valve body for resizing a first axial section of the bore prior to installation of the present TCC regulator valve assembly shown in FIGS. 3A and 3B.

To install the present TCC regulator valve assembly 10, the retaining clip 117, end plug 115, regulator apply valve 102, spring 106, and either isolator valve 105 or 105' of the prior art are removed from the valve body bore 111. The OEM clip 117 and spring 106 are retained for reuse. Using a reaming tool 150' such as Sonnax reamer (77754-R2) the bore 111 is enlarged to a sufficient size to accommodate the valve sleeve 15 as illustrated in FIG. 7. Reamer 150' includes a cutting diameter 152, which is piloted by a guide diameter 154 that locates in a distal end (i.e. second axial section) of the bore 111 to ensure that the sleeve 15 will be concentric to the isolator valve 25 once installation is complete. After removal of any debris and burrs from the resized proximal end (i.e. first axial section) of bore 111 and applying lubrication, the present TCC regulator valve assembly 10 is installed as shown in FIGS. 3A and 3B.

Figure 8:
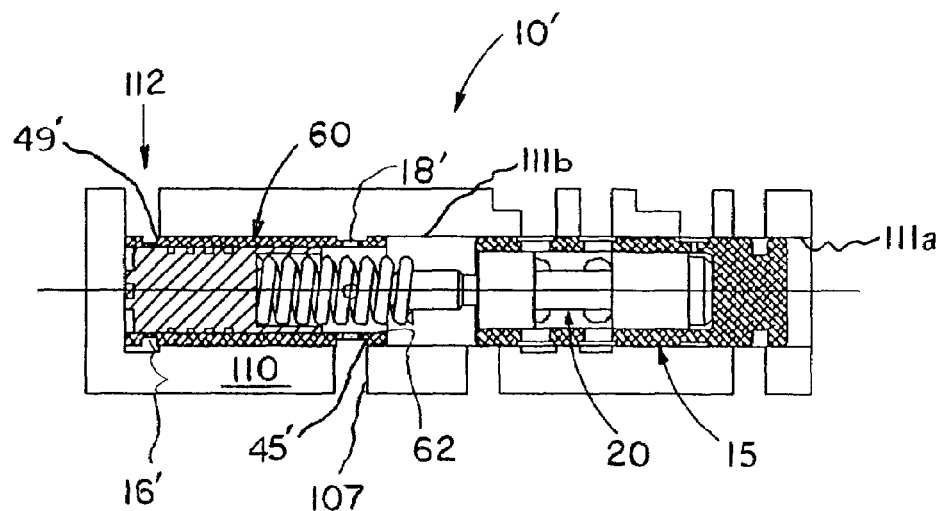
FIG. 8 is a longitudinal cross-section of another embodiment of the replacement TCC regulator valve assembly including an isolator valve sleeve.

In some instances the distal end of the bore 111 wherein the isolator valve 25 resides has such extreme wear that even the present modified isolator valve 25 will not prevent excessive oil loss. In this circumstance another embodiment of the TCC regulator valve assembly 10' is provided as shown in FIG. 8. In this embodiment an isolator valve sleeve, indicated generally at 60, is utilized to remedy the leakage problem and to restore hydraulic integrity to the present valve assembly 10'.

The isolator valve sleeve 60 is a generally cylindrical construction, which is also fabricated from a high grade 4032-T6/T651/T86 aluminum and includes an internal bore 62 of a sufficient size to permit the oscillating movement of the present Isolator Valve 25 as described hereinabove. Sleeve 60 is provided with a plurality of inlet ports 16' and a plurality of outlet ports 18' formed at 90 degree intervals within annular grooves 49' at predetermined locations in fluid communication with the PWM TCC solenoid circuit 112 and exhaust port 107 respectively in a manner similar to the regulator valve sleeve 15 (FIG. 5).

The present sleeve 60 functions to restore the hydraulic integrity of the TCC solenoid circuit 112 and to provide full support to the isolator valve 25 within the sleeve 60 thereby eliminating side-loading and the excessive wear problems inherent in the OEM and remanufactured OEM designs described hereinabove. In all other respects the TCC regulator valve assembly 10' including the isolator valve sleeve 60 operates in substantially the same manner as the TCC regulator valve 10 as described hereinabove.

Figure 9:
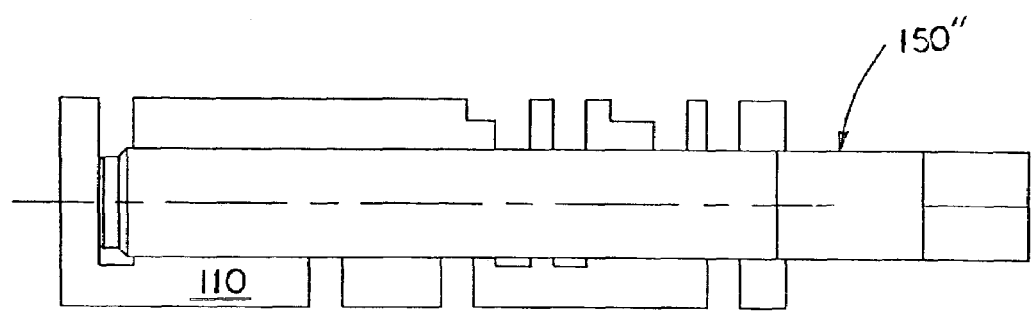
FIG. 9 is a longitudinal cross-section of an alternative reaming tool of the present invention for resizing a second axial section of the bore prior to the installation of the replacement TCC regulator valve assembly including the isolator valve sleeve shown in FIG. 8.

In order to install the TCC regulator valve assembly 10' an alternate reaming tool 150" such as Sonnax reamer (77754-RM5) is utilized to enlarge the distal end (i.e. second axial section) 111*b* of the bore 111 to a sufficient size to accommodate the valve sleeve 60 as illustrated in FIG. 9. After removal of any debris and burrs from the resized distal end 111*b* of the bore 111 and applying lubrication, the present regulator valve assembly 10' is installed as shown in FIG. 8.

In operation the output pressure from the PWM TCC solenoid in the high duty cycle enters the TCC regulator valves 10, 10' via the PWM TCC solenoid circuit 112, which strokes the isolator valve 25 (i.e. to the right) from the closed position shown in FIG. 3A to the open position shown in FIG. 3B. It can be seen that the proximal end of the isolator valve 25 surrounding spring recess 27 resides in an unworn portion of the bore 111*b* (FIG. 3B) adjacent the exhaust port 107, which would not have been traversed by any of the OEM isolator valves 105, 105', 105" due to their shorter axial length.

Simultaneously, the regulator apply valve 20 is also stroked opening the TCC apply circuit 114 to line pressure via line port 113 (FIG. 3B). As the apply valve 20 oscillates within the sleeve 15, the groove 24 functions to distribute pressure across the circumference of land 42 eliminating side loading of the valve 20 within sleeve 15. It can be seen that sleeve 15 extends partially over exhaust port 108 (FIG. 3B). This protects that portion of the bore 111*a* that is susceptible to wear in the OEM design due to repeated oscillation and causes ATF/pressure leakage in the prior art regulator apply valves 102, 102'.

As the PWM TCC solenoid cycles and returns to a lower percentage duty cycle, the hydraulic pressure in the PWM TCC solenoid circuit 112 is depleted. The isolator spring 106 then forces the Isolator Valve 25 back to the closed position with the assistance of fluid pressure entering the balance apply circuit at 116 and the solenoid cycle is repeated.

Although not specifically illustrated in the drawings, it should be understood that additional equipment and structural components will be provided as necessary and that all of the components described above are arranged and supported in an appropriate fashion to form a complete and operative torque converter clutch regulator valve assembly and method of installation incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A replacement torque converter clutch regulator valve assembly for installation in a mating bore within the valve body of an automatic transmission, wherein said valve assembly is disposed in fluid communication between a line pressure circuit and a converter apply circuit, said valve assembly being responsive to output pressure generated by a pulse width modulated solenoid circuit and also to a counteracting pressure from a balance apply circuit, said valve assembly comprising:

a replacement regulator apply valve having a plurality of control lands formed thereon for controlling the release of fluid from said line pressure circuit to said converter apply circuit, said apply valve including a balance apply reaction surface in fluid communication with said balance apply circuit;

a regulator apply valve sleeve radially disposed about said apply valve, said regulator apply valve sleeve including an integrated end cap for retaining said valve assembly within said valve body;

a replacement isolator valve disposed in coaxial relation to said apply valve, said isolator valve responding directly to said output pressure generated by said pulse width modulated solenoid circuit; and a compression spring disposed intermediate said isolator valve and said apply valve for transferring said output pressure to said apply valve.

2. The replacement torque converter clutch regulator valve assembly of claim 1 wherein said balance apply reaction surface is reduced by up to ten percent in comparison to the original equipment regulator apply valve in order to increase the influence of said pulse width modulated solenoid circuit on said replacement regulator apply valve.

3. The replacement torque converter clutch regulator valve assembly of claim 2 wherein said apply valve sleeve includes at least one fluid inlet and at least one fluid outlet formed therein, said at least one fluid inlet and said at least one fluid outlet being disposed in fluid communication with said line pressure circuit and said converter apply circuit respectively to permit the flow of transmission fluid through said valve assembly.

4. The replacement torque converter clutch regulator valve assembly of claim 3 wherein said at least one fluid inlet and said at least one fluid outlet are disposed in fluid communication with annular grooves formed about said apply valve sleeve to distribute the flow of transmission fluid about the outer circumference thereof.

5. The replacement torque converter clutch regulator valve assembly of claim 4 wherein said apply valve sleeve includes at least one balance apply orifice at a predetermined axial location in fluid communication with said balance apply circuit.

6. The replacement torque converter clutch regulator valve assembly of claim 2 wherein said isolator valve has an increased axial length in comparison to the original equipment isolator valve such that said replacement isolator valve resides at least partially within an unworn portion of said mating bore concentric to said replacement regulator apply valve.

7. The replacement torque converter clutch regulator valve assembly of claim 6 wherein said replacement isolator valve includes a plurality of annular lubrication grooves formed thereon at regular axial intervals.

8. The replacement torque converter clutch regulator valve assembly of claim 7 wherein said replacement isolator valve includes a spring recess integrally formed therein at a distal end thereof, wherein said compression spring is positioned in said spring recess.

9. The replacement torque converter clutch regulator valve assembly of claim 2 wherein said integrated end cap includes an annular retaining groove for receiving a retaining clip therein.

10. The replacement torque converter clutch regulator valve assembly of claim 2 including an isolator valve sleeve radially disposed about said replacement isolator valve and installed within said valve body in concentric relation to said apply valve sleeve.

11. The replacement torque converter clutch regulator valve assembly of claim 10 wherein said isolator valve sleeve includes at least one fluid inlet and at least one fluid outlet formed therein, said at least one fluid inlet and said at least one fluid outlet being disposed in fluid communication with said pulse width modulated circuit and said fluid exhaust circuit respectively.

12. The replacement torque converter clutch regulator valve assembly of claim 11 wherein said at least one fluid inlet and said at least one fluid outlet are further disposed in fluid communication with annular grooves formed on said replacement isolator valve sleeve to distribute the flow of transmission fluid about the circumference thereof.

13. An improved torque converter clutch regulator valve assembly for installation within a mating bore in the valve body of an automatic transmission, said torque converter clutch regulator valve assembly including a regulator apply valve and an isolator valve disposed in fluid communication between a line pressure circuit and a converter apply circuit, said isolator valve responding directly to outlet pressure generated within a pulse width modulated solenoid circuit and further responding to a counteracting pressure from a balance apply circuit to control the flow of line pressure into said converter apply circuit, wherein the improvement comprises:

a replacement regulator apply valve having a plurality of control lands formed thereon for regulating fluid flow from said line pressure circuit to said converter apply circuit, said replacement regulator apply valve including a balance apply reaction surface in fluid communication with said balance apply circuit, said reaction surface having up to ten percent less surface area than the original equipment regulator apply valve to increase the responsiveness of said replacement regulator apply valve to said pulse width modulated solenoid circuit; and a regulator apply valve sleeve radially disposed about said replacement regulator apply valve, said regulator apply valve sleeve including an integrally formed end cap for retaining said valve assembly within said valve body.

14. The improved torque converter clutch regulator valve assembly of claim 13 including a replacement isolator valve having a substantially increased axial length in comparison to the original equipment isolator valve such that said replacement isolator valve resides at least partially within an unworn portion of said mating bore in said valve body ensuring concentric operation of said replacement isolator valve with said regulator apply valve.

15. The improved torque converter clutch regulator valve assembly of claim 14 wherein said replacement isolator valve includes a plurality of annular lubrication grooves formed thereon at regular intervals to retain transmission fluid therein preventing side loading in operation.

16. The improved torque converter clutch regulator valve assembly of claim 14 wherein said replacement isolator valve includes a spring recess integrally formed therein at a first end thereof, said compression spring being positioned in said spring recess intermediate said replacement isolator valve and said replacement regulator apply valve.

17. The improved torque converter clutch regulator valve assembly of claim 14 including an isolator valve sleeve being radially disposed about said isolator valve and installed within said valve body in concentric relation to said regulator apply valve sleeve.

18. The improved torque converter clutch regulator valve assembly of claim 17 wherein said isolator valve sleeve includes at least one inlet port formed in fluid communication with said pulse width modulated solenoid circuit.

* * * * *